United States Patent
Sauvignet et al.

(10) Patent No.: US 8,092,688 B2
(45) Date of Patent: Jan. 10, 2012

(54) METHOD OF TREATING WATER BY BALLASTED FLOCCULATION/SETTLING, WHICH INCLUDES A CONTINUOUS MEASUREMENT OF THE BALLAST, AND CORRESPONDING INSTALLATION

(75) Inventors: Philippe Sauvignet, Saint-Etienne-en-Cogles (FR); Jean-Francois Beaudet, Montreal (CA); Sonia Guillot, Conflans Saint-Honorine (FR); Valery Ursel, Les Pavillons Sous Bois (FR)

(73) Assignee: OTV SA, Saint-Maurice Cedex (FR)

( * ) Notice: Subject to any disclaimer, the term of this patent is extended or adjusted under 35 U.S.C. 154(b) by 249 days.

(21) Appl. No.: 12/375,725

(22) PCT Filed: Jul. 25, 2007

(86) PCT No.: PCT/EP2007/057684
§ 371 (c)(1), (2), (4) Date: Jun. 1, 2009

(87) PCT Pub. No.: WO2008/015143
PCT Pub. Date: Feb. 7, 2008

(65) Prior Publication Data
US 2009/0308815 A1 Dec. 17, 2009

(30) Foreign Application Priority Data
Aug. 1, 2006 (FR) .................................. 06 07040

(51) Int. Cl.
*C02F 1/52* (2006.01)
(52) U.S. Cl. ........ 210/709; 210/711; 210/713; 210/714; 210/727
(58) Field of Classification Search .................. 210/709
See application file for complete search history.

(56) References Cited

U.S. PATENT DOCUMENTS 3,923,652 A * 12/1975 Condolios et al. ............ 210/738
4,226,714 A * 10/1980 Furness et al. ................ 210/723
(Continued)

FOREIGN PATENT DOCUMENTS
DE 4333579 4/1995
(Continued)

*Primary Examiner* — Peter A Hruskoci
(74) *Attorney, Agent, or Firm* — Coats & Bennett, P.L.L.C.

(57) ABSTRACT

A method for treating water in a ballasted flocculation system comprises directing water into a ballasted flocculation zone and adding ballast and a flocculation reagent to the water to form a water-floc mixture. The water-floc mixture is directed into a settling zone to form treated water and sludge containing ballast. The ballast is then directed to a recirculation line where the ballast is recirculated to the ballasted flocculation zone. The method further includes determining the ballast concentration and comparing the ballast concentration with a predetermined threshold value. The rate at which ballast is recirculated to the ballasted flocculation zone is adjusted based on the determined ballast concentration and the predetermined threshold value. A ballasted flocculation system for treating water comprises a ballasted flocculation zone, a water inlet for directing water into the ballasted flocculation zone, and a flocculation reagent inlet for directing flocculation reagent into the ballasted flocculation zone. The system includes a settling zone for separating treated water from sludge containing ballast and a recirculation line for recirculating ballast from the settling zone to the ballasted flocculation zone. A first ballast inlet is operatively connected to the recirculation line for directing ballast into the ballasted flocculation zone. Finally, the system includes a sensor for measuring a parameter of ballast in the system.

18 Claims, 2 Drawing Sheets

U.S. PATENT DOCUMENTS

| | | | |
|---|---|---|---|
| 4,388,195 A * | 6/1983 | von Hagel et al. | 210/709 |
| 5,601,704 A * | 2/1997 | Salem et al. | 210/86 |
| 6,383,370 B1 * | 5/2002 | Keever et al. | 210/96.1 |
| 6,824,692 B2 * | 11/2004 | Binot et al. | 210/709 |
| 7,001,525 B2 * | 2/2006 | Binot et al. | 210/709 |
| 7,083,715 B2 * | 8/2006 | Binot | 210/112 |
| 7,311,841 B2 * | 12/2007 | Binot et al. | 210/666 |
| 7,648,637 B1 * | 1/2010 | Sauvignet et al. | 210/661 |
| 2004/0090625 A1 | 5/2004 | Fischer et al. | |

FOREIGN PATENT DOCUMENTS

| | | |
|---|---|---|
| FR | 2815714 | 4/2002 |
| WO | 9743027 | 11/1997 |
| WO | 0140121 | 6/2001 |
| WO | 03053862 | 7/2003 |
| WO | 03070377 | 8/2003 |

* cited by examiner

METHOD OF TREATING WATER BY BALLASTED FLOCCULATION/SETTLING, WHICH INCLUDES A CONTINUOUS MEASUREMENT OF THE BALLAST, AND CORRESPONDING INSTALLATION

This application is a U.S. National Stage Application of PCT Application No. PCT EP/2007/057684, with an international filing date of 25 Jul. 2007. Applicant claims priority based on French Patent Application No. 06/07040 filed 1 Aug. 2006. The subject matter of these applications is incorporated herein.

The invention relates to the field of water treatment, and finds application, in particular, within the framework of wastewater treatment methods, particularly those implementing flocculation-sedimentation.

These methods consist in adding one or more reagents to the wastewater, making it possible to flocculate at least a large portion of the pollutants present in the water, and in then separating the floc thus formed from the purified water.

According to one type of preferred system, means of adding at least one granular material denser than water, such as sand, are provided to ballast the said flocs and thereby promote and accelerate the sedimentation thereof. A device such as this is described in particular in the published French patent document under the number FR 2 627 704.

The ballast, usually fine sand with a mean diameter ranges from 60 to 300 micrometers, is introduced into the water being treated upstream from or during the flocculation step with a flocculation reagent, so as to form a heavy floc capable of settling faster, with "mirror" speeds which can exceed 15 m/h, and sometime even 100 m/h.

After sedimentation, the ballast is separated from the bulk of the sludge forming the remainder of the floc, which is extracted from the system, while the ballast is recycled to the beginning of the system.

The terms "ballasted flocculation-sedimentation", "ballasted flocculation" or "ballasted sedimentation," will hereinafter refer to the techniques for ballasted flocculation-sedimentation with a fine particulate ballast denser than water and water-insoluble. The term sand will also refer to the ballast, whether it is sand or another bulk granular material.

For water having given characteristics (type of water, concentration in suspended solids SS and in various pollutants), for a given type of ballast (size, density, composition), and for a given flocculation reagent, ballasted flocculation-sedimentation works optimally when the mean sand concentration in the flocculation zone, which can be represented by the sand rate (kg of recycled sand in the flocculation zone per $m^3$ of water entering this zone over the same time period), is maintained within a given concentration range.

For commonly treated water, the optimal concentration ranges from 1 to 20 kg of sand/$m^3$, and most frequently from about 3 to 10 kg/$m^3$.

Experiment of these methods shows that the sand concentration in the flocculation zone tends to vary over time, for the following reasons in particular:
  a portion of the ballast circulating within the system can escape with the treated water, either due to the fact that this ballast consists of a very fine sand particle attached to a very light floc having a tendency to float, or due to the fact that the ballast particle was not integrated into a floc during the flocculation phase, and has a tendency to settle less quickly than the ballasted flocs, or else due to the fact that certain ballasted flocs do not have time to settle in the sedimentation zone due to local hydraulic short circuits;
  another portion of the ballast circulating within the system can also escape with the sludge extracted from the system. As a matter of fact, a certain proportion of sand, based on the size of the particles and on the rating of the hydrocyclones commonly used for separating the sand from the excess sludge prior to recycling the sand, can escape as overflow from the hydrocyclones. Accidental clogging of the underflow of a hydrocyclone can also quickly result in the loss of a certain quantity of sand along with the sludge;
  variation in hydraulic conditions, e.g., an increase in the flow rate of water being treated, can result in a variation in the sand concentration in the flocculation zone, e.g., a decrease thereof, particularly when the sand is brought back to the low centre point of the bottom of the sedimentation tank by a scraper, which can introduce a sand storage effect at the at the bottom of the sedimentation tank.

With the previously mentioned type of system, monitoring the concentration of granular material in the fluid being treated is usually carried out either by direct sampling from the flocculation zone, and by measuring the concentration of granular material, or by dividing the flux of recycled granular material (in kg/h) in order to ballast the floc by the discharge rate of treated water (in $m^3$/h). The flow of granular material is measured in the underflow of the recycling hydrocyclone.

However, this manner of operating presents certain disadvantages, and in particular:
  the measurements of sand concentration by sampling the underflows of the hydrocyclones are difficult to carry out (hydrocycloning underflows consisting of mixed jets of sludge, sand and water capable of assuming different cord-like or parachute-like jet shapes based on instantaneous flow rates) and can yield results which are incomparable from one operator to another, and which are therefore difficult to use;
  the operator works blindly between two measurements, and cannot react to operating malfunctions (e.g., clogging of a hydrocyclone) occurring between two measurements: the system can lose a significant portion of its sand before the operator has had the opportunity to react;
  this type of manual measuring is unpleasant to carry out, time-consuming, and therefore costly for a limited degree of efficiency.

In order to minimise the risk of losing sand between two measurements of concentration, a technique disclosed in the published patent document under the number FR 2 815 714 proposes to install sedimentation devices on all or a portion of the sludge extracted from the hydrocyclones. The height of the settled sand is measured periodically, e.g., every 15 minutes, as is the settled sand discharged through a tank bottom valve opening, after the measurement. When an abnormal height of sand is detected during the measurement period (in this case, 15 minutes), an alarm informs the operator of an abnormal loss of sand and allows them to intervene faster.

However, this type of device retains various disadvantages:
  it operates only semi-continuously (with a 15-minute period in the example described above), and therefore does not enable an immediate reaction, which can result in significant losses of sand in the case of unexpected clogging of the underflow of a hydrocyclone, for example;
  it detects significant and abnormal losses of sand, but does not make it possible to continuously measure or calculate the variation in sand concentration in the flocculation zone, or to automatically react to these variations in order to compensate for them; thus, this technique substantially aims at detecting abnormal operation, but does not make it possible to correct slight variations for the purpose of optimising operation;

it is made of fine sheet metal, and is therefore relatively expensive.

These disadvantages are due, in particular, to the fact that the measurement is carried out on the overflow of the hydrocyclone, and this overflow contains only very slight amount of the ballast.

Furthermore, it is noted that this technique does not carry out the measure on the ballast during the recirculation thereof.

In other words, this technique involves implementing a diversion of the ballast recirculation means, the measurement being carried out on the diverted ballast, in parallel with the recirculation of the bulk of the ballast.

Besides the low responsiveness of this technique, it thus involves the implementation of a measurement sub-system, entailing significant installation costs.

In particular, the objective of the invention is to mitigate the disadvantages of the prior art.

More precisely, the objective of the invention is to propose a method for continuous monitoring of the ballast concentration in the flocculation zone of a ballasted flocculation-sedimentation system.

The invention also has the objective of providing such a method, which enables rapid detection of the variations in ballast, for the purposes of compensating for them and of optimising the yield of the water treatment system.

The invention also has the objective of providing such a method, which is inexpensive to implement, in particular in that it avoids the manufacture and implementation of specific heavy equipment such as settling columns in which the height of the ballast is measured according to the method described with reference to the prior art.

Another objective of the invention is to provide such a method, which is simple in design and easy to implement, in particular on existing systems.

These objectives, as well as other which will become apparent hereinbelow, are achieved by the invention, the object of which is a method for treating water by flocculation-sedimentation, including steps for injecting and re-circulating a ballast, characterized in that it includes a step for continuously measuring the concentration of said ballast and a step for comparing said measurement with reference values.

Thus, unlike to the prior art, continuous measurement enables rapid compensation for the detected variations and ensures optimal yield of the treatment system. Thus, the invention is not limited to detection of abnormal operation, as is the case with the prior art.

Another object of the invention is a water treatment system for implementing the previously described method, including:

- at least one flocculation zone provided with means of introducing a ballast and agitating means;
- at least one sedimentation zone provided with a zone for recovering a mixture of sludge and ballast, and means for discharging clarified water;
- means for re-circulating said ballast, in a mixture with said sludge and/or separated from said sludge, towards means for re-injecting the bulk of said re-circulated ballast into and/or upstream from said flocculation zone, characterized in that it includes at least one measuring sensor for a parameter correlated to the concentration of said ballast, said sensor or sensors being situated in a zone of said system in which said ballast is circulating continuously.

According to a first embodiment, said sensor or sensors are situated on said re-circulation means.

According to a second embodiment, said sensor or sensors are submerged in said flocculation zone and/or at the outlet thereof.

Thus, the invention proposes to carry out a measurement either on the means for re-circulating the ballast, i.e., in a portion of the system where the ballast is present in large quantities, or directly in the flocculation zone, i.e., at the location where the ballast concentration directly affects the quality of the flocs formed.

This enables continuous measurement of the variations in the ballast concentration with, as result, a high degree of responsiveness.

Contrary to the prior art described in the patent document published under the number FR 2 815 714, measuring is carried out efficiently and quickly, this being done either on the ballast re-circulation line or directly in the flocculation zone, i.e., without diverting the ballast line and without requiring a specific sub-system (ballast settling columns).

According to a first alternative embodiment, said sensor is a Coriolis effect mass flowmeter sensor.

A sensor of this type demonstrates high accuracy and good measurement reliability, and results in easy maintenance.

According to a preferred second alternative embodiment, said sensor is an ultrasound sensor.

Such sensor differs by its easy installation, calibration and maintenance, and has a high degree of accuracy and good measurement reliability, all of this at a low price.

According to a third alternative embodiment, said sensor is an acoustic sensor with noise analysis.

Such sensor, for example, can be a piezoelectric sensor, which allows the measurement of the solid particle concentration by analysing the noise caused by these particles striking the wall on which the sensor is implanted.

According to one advantageous solution, said re-circulation means include sludge/ballast separating means situated upstream from said flocculation zone.

In this case, said sludge/ballast separating means preferably include at least one hydrocyclone.

According to a first alternative, said sensor is situated on said re-circulation means upstream from said hydrocyclone.

According to a second alternative, said sensor is situated on said re-circulation means in the underflow of said hydrocyclone.

According to another conceivable solution, said re-circulation means are provided in order to re-circulate said ballast in a mixture with said sludge, to the said flocculation zone. In this case, the sludge/ballast separating means operate only periodically, or else are installed on a re-circulation line operating in parallel.

In the case where the sensor or sensors are submerged in the flocculation zone and/or at the outlet thereof, the sensor is preferably an infra-red absorption sensor.

Such sensor provides good reliability in the measurement of the suspended solids concentration within the usual range of concentration in the flocculation zone.

Said ballast advantageously consists in fine sand, which mean diameter particles ranges from about 60 micrometers to about 300 micrometers.

The system preferably includes means for processing data derived from said sensor or sensors, including means for comparing said data with predetermined thresholds.

In this case, according to several conceivable advantageous characteristics, taken alone or in combination, said means of comparison are coupled with:

a motor pump unit for said recovery zone, so as to start/stop said motor pump unit on the basis of said comparison of said data with said thresholds;

an alarm capable of being triggered on the basis of said comparison of said data with said thresholds;

a means of calculating the ballast concentration at a given point in the system (e.g., in the flocculation zone, or at the point of measurement) based on the correlation established between the parameter measured by the sensor and the ballast concentration at the point of measurement.

a means of calculating the loss of ballast based on the slope of the curve representing concentration with relation to time.

a means of injecting a ballast make-up capable of being activated/deactivated on the basis of said comparison of said data with said thresholds.

said flocculation zone so as to stop/authorize the operation thereof.

According to another advantageous characteristic, said data processing means are coupled with at least one means of displaying the calculated concentration of ballast for at least one point in the system.

According to yet another advantageous characteristic, said data processing means include means of calculating the loss of ballast from a curve representing the concentration of ballast with relation to time.

Other characteristics and advantages of the invention will become more apparent upon reading the following description of a preferred embodiment of the invention and or of several alternatives thereof, given as non-limiting and illustrative examples, and from the appended drawings, in which.

Figure 1:
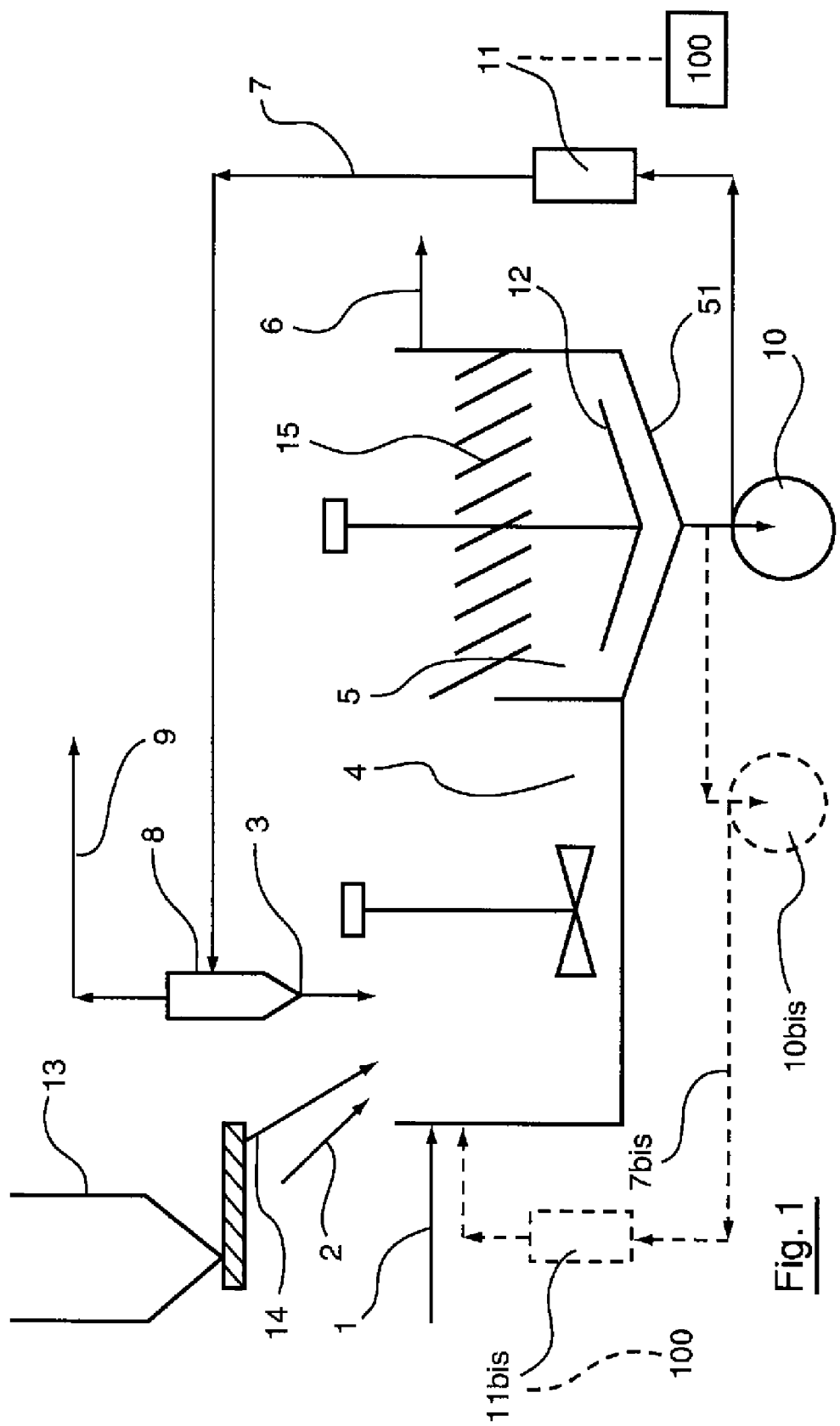
FIG. 1 is a schematic representation of a water treatment system according to a first embodiment of the invention.

As indicated previously, the principle of the invention is based on the fact of measuring, in a system for treating water via ballasted flocculation-sedimentation, a parameter correlated to the ballast concentration in the ballast re-circulation line, during the re-circulation thereof.

A system according to the invention is of the type including:

at least one inlet 1 for water to be treated, at least one flocculation agitation tank 4, into which at least one flocculation reagent is injected via an injection means 2 and return of a ballast, such as fine sand, via an injection means 3;

a settling tank 5, equipped or not with sedimentation blades 15, and provided with means for discharging clarified water 6, as well as a zone for recovering 51 a mixture of sludge and ballast;

a re-circulation line 7;

a settled mixture of sand and sludge, using an extraction pump 10;

at least one hydrocyclone enabling the separation and recycling of sand prior to sending the excess sludge to the subsequent storage and treatment means via said means.

As shown, the re-circulation line 7 provides for the re-injection of the bulk of the re-circulated ballast via the underflow 3 of the hydrocyclone.

According to one alternative, the extraction of the sand/sludge mixture is carried out by a pump 10bis and a line 7bis provided for re-injecting the mixture directly into the flocculation tank 4, without passing through the hydrocyclone 8.

According to the principle of the invention, a measuring sensor for a parameter correlated to the sand concentration is installed.

To do so, a sensor 11 is provided on the re-circulation line, upstream from the hydrocyclone, the sand thus being mixed together with the sludge.

According to one conceivable alternative, the sensor is provided on the sand re-injection line, in the underflow 3 of the hydrocyclone 8.

According to yet another conceivable alternative, a sensor 11bis is mounted on the re-circulation line 7bis, upstream from the point for re-injecting the sand/sludge mixture re-injecting point into the tank 4.

The sensor (or sensors) 11, 11bis are preferably of the type belonging to the following group:

a Coriolis effect mass flowmeter, such as those marketed by the Krohne Company (Optimass 7100 (registered trademarks), or by the Endress Hauser Company (Promass 83F (registered trademarks);

an ultrasound flowmeter, measuring the attenuation of an ultrasound signal transmission, such as those marketed by the Solarton Mobrey Company (MSM 400, registered trademarks);

acoustic sensor with analysis of the noise produced by the solid particles striking the wall of the piping, such as those marketed by the Roxar Company SAM 400-TC, registered trademarks).

In the event that a flowmeter or acoustic sensor is used, it is noted that the system also comprises a means, not shown in the figure, for measuring the flow rate passing through the line equipped with the ultrasound flowmeter.

Sensors of the previously mentioned type enable satisfactory results to be obtained, and were selected, in particular with regard to the nature of the mixture of sludge and sand, with variations in the sludge concentration from 0 to 20 g/l, and variations in the sand concentration from 0 to 600 g/l, a series of tests having been conducted on various types of sensors.

The tests conducted on various sensors demonstrated, in particular, that the infra-red absorption-based sensors function but do not prove to be sufficiently reliable, particularly at high concentrations of sand (concentrations higher than 150 g/l for certain IR sensors, greater than 400 g/l for others), as well as microwave absorption-based sensors, which also function but which are expensive, poorly suited to large diameters and low temperatures, as well as to high microsand concentrations.

Tests conducted for sand concentration ranges (effective diameter of 85 Micrometers, and more generally speaking a mean diameter of between 60 Micrometers and 300 Micrometers), consistent with the usual concentrations in this type of structure, and between 0.001 and 600 grams per liter, and for temperatures between 0 and 80° C., demonstrated the following performances:

with acoustic sensors and noise analysis: simple and quick set-up (less than 15 minutes, even on large-diameter piping), and rapid response to events;

with ultrasound sensors: a good degree of accuracy is obtained, compared with direct measurements (2%), excellent reliability, the potential for installation on large-diameter piping (300 mm and more), high maintainability, at a reasonable cost and with minimal head loss;

with the Coriolis effect sensors: an excellent degree of accuracy is obtained compared with direct measurements (0.15%), and an excellent degree of reliability; high maintainability, a high price, head loss—induced by the limited piping size—remaining acceptable. This type of sensor, unlike all the others, measures not only concentration of microsand (ballast), but also the (mass)

flux thereof. This introduces an enormous advantage over the other types of sensors (ultrasound, acoustic, etc.), because there is no need to add a flow measurement onto the re-circulation loop, or to even enter (programme) a flow value (design) into the automatic control system in order to obtain the mass flux.

In one preferred alternative, the measurement of a parameter correlated to the ballast concentration is carried out via ultrasound absorption. This measurement is calibrated via sampling, in order to be correlated with the concentration of ballast flowing through the piping. Threshold concentration values are defined by the users. The sensor 11, 11*bis* data are transferred to processing means 100 for the purpose of displaying the calculated ballast concentration and of comparing the sensor data with the threshold values, with the result being that, exceeding these thresholds in either direction results in the operation of any, or any combination of the following actions:

triggering of a high-level or low-level concentration alarm;
stopping of the ballasted-floc flocculation-sedimentation unit;
start-up/stopping, or change in the rotational speed of the pressure pump 10, 10*bis*;
increase/decrease in the rotational speed of the scraper 12 possibly present at the bottom of the settling tank 5;
evaluation of the instantaneous loss of ballast from the value of the slope of the ballast concentration curve with relation to time;
injection 14 from storage 13 of a given quantity of ballast, intended to compensate for the losses of ballast detected by measuring.

Figure 2:
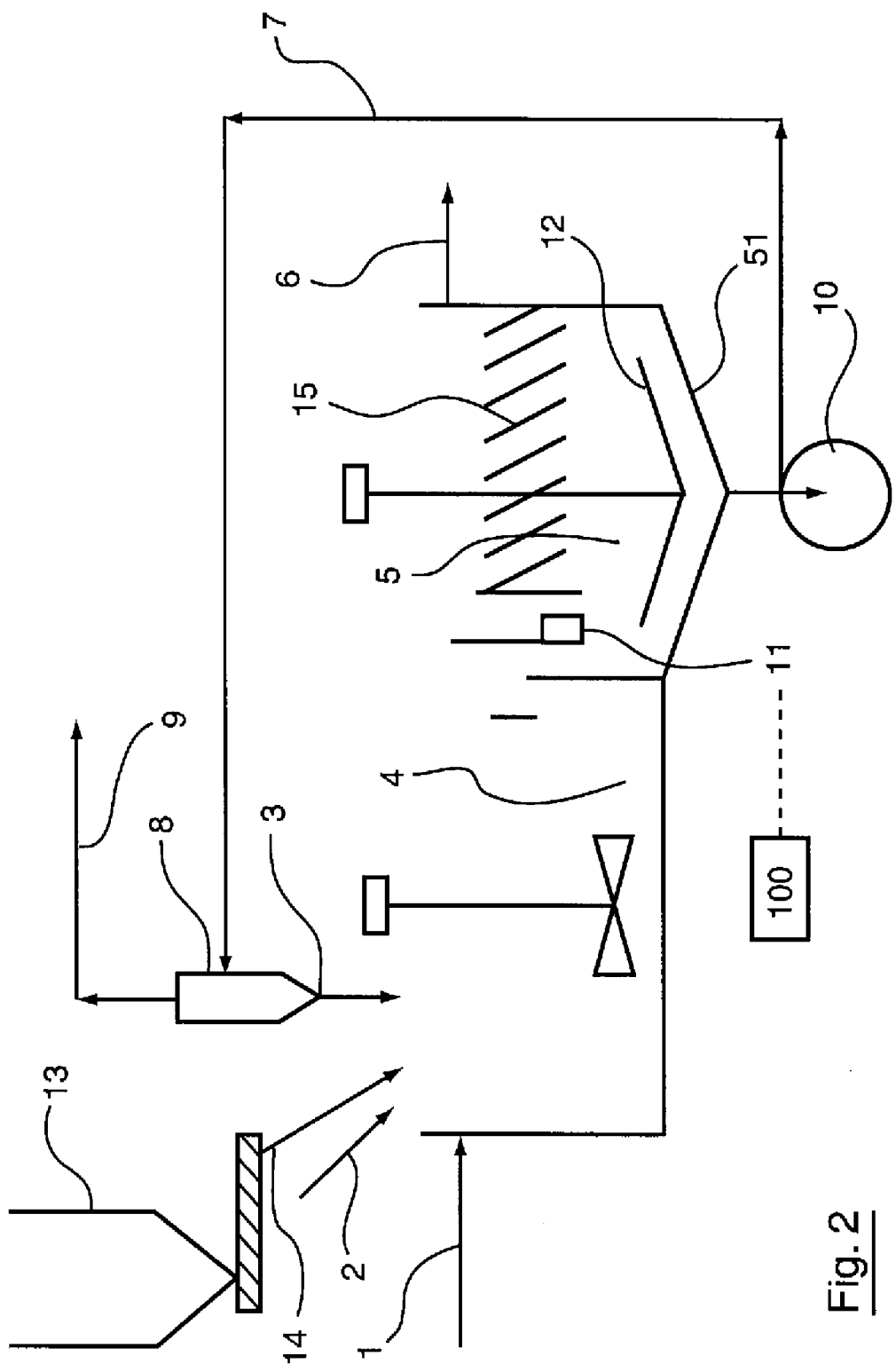
FIG. 2 is a schematic representation of a water treatment system according to a second embodiment of the invention.

FIG. 2 corresponds to the second embodiment, with a sensor 11 submerged directly into or at the outlet of the flocculation zone, upstream from the sedimentation zone.

When carrying out experimental testing, the probe used was a infra-red Solitax sc TS-line probe (registered trademark), marketed by the Hach Company, and enabling measurement of the concentration of suspended solids within the concentration range of 0.001 to 50 g/l, i.e., well-suited to the usual concentrations in the flocculation zone (0.5 to 15 g/l of sand), and lower than in the ballast re-circulation line.

The probe was installed immediately after the weir wall at the outlet of the flocculation tank, 40 cm deep, approximately at the middle of the weir in the horizontal direction.

During the experimental testing period, differences in measurement between the probe and the manual measuring means tested were between 0.4 and 5.8%.

The invention claimed is:

1. A method for treating water in a ballasted flocculation system comprising:
directing water into a ballasted flocculation zone;
adding ballast and a flocculation reagent to the water to form a water-floc mixture;
directing the water-floc mixture into a settling zone to form treated water and sludge containing ballast;
directing the sludge containing ballast to a recirculation line and recirculating the sludge containing ballast to the ballasted flocculation zone;
determining the concentration of ballast in the recirculation line or in the ballasted flocculation zone;
comparing the determined concentration of ballast with a predetermined threshold value; and
adjusting the ballast concentration in the ballasted flocculation zone based on the determined ballast concentration and the predetermined threshold value.

2. The method of claim 1 further comprising adjusting the rate at which ballast is recirculated to the ballasted flocculation zone based on the determined ballast concentration and the predetermined threshold value.

3. The method of claim 1 further comprising adding additional ballast from a holding zone to the ballasted flocculation zone based on the determined ballast concentration and the predetermined threshold value.

4. The method of claim 1 further comprising measuring the ballast concentration in the recirculation line.

5. The method of claim 1 further comprising maintaining a substantially constant ballast concentration in the ballasted flocculation zone.

6. The method of claim 5 wherein the ballast concentration is maintained between approximately 1 $kg/m^3$ to approximately 20 $kg/m^3$.

7. The method of claim 6 wherein the ballast concentration is maintained between approximately 3 $kg/m^3$ to approximately 10 $kg/m^3$.

8. The method of claim 1 further comprising:
pumping ballast through the recirculation line; and
adjusting the rate at which ballast is pumped through the recirculation line such that the ballast concentration in the ballasted flocculation zone is generally maintained at a selected level.

9. The method of claim 4 further comprising sensing a parameter of the ballast in the ballasted flocculation zone with an ultrasound sensor and determining the concentration of the ballast in the recirculation line based on the sensed parameter.

10. The method of claim 4 wherein the ballasted flocculation system includes a hydrocyclone having an overflow and an undertow and the method further comprises sensing a parameter of the ballast in the underflow of the hydrocyclone.

11. The method of claim 1 further comprising calculating the loss of ballast in the ballasted flocculation zone over time.

12. The method of claim 11 further comprising calculating the instantaneous loss of ballast in the ballasted flocculation zone over time.

13. The method of claim 11 further comprising adding additional ballast from a holding zone to the ballasted flocculation zone based on the calculated loss of ballast in the ballasted flocculation zone.

14. The method of claim 1 further comprising triggering an alarm indicating that the ballast concentration in the ballasted flocculation zone is either higher or lower than the predetermined threshold value.

15. The method of claim 1 wherein the settling zone includes a scraper and the method further comprises increasing or decreasing the rotational speed of the scraper based on the determined ballast concentration and predetermined threshold value.

16. The method of claim 1 further comprising measuring the concentration of the ballast in the flocculation zone.

17. The method of claim 1 further comprising measuring the concentration of the ballast at an outlet of the flocculation zone.

18. A method for treating water in a ballasted flocculation system comprising:
directing water into a ballasted flocculation zone;
adding ballast and a flocculation reagent to the ballasted flocculation zone to form a water-floc mixture;
directing the water-floc mixture into a settling zone to form treated water and sludge containing ballast;
continuously measuring the concentration of ballast in the ballasted flocculation zone;

comparing the measured concentration of ballast in the ballasted flocculation zone with a predetermined threshold value;

pumping the sludge containing ballast from the settling zone to a separator through a first recirculation line, separating the ballast from the sludge, and directing the ballast from the separator to the ballasted flocculation zone or directly recirculating the sludge containing ballast from the settling zone through a second recirculation line to the ballasted flocculation zone;

determining the flow rate of the sludge containing ballast in the ballasted flocculation system in either the first or the second recirculation line; and changing the flow rate of the sludge containing ballast in either the first or second recirculation line based on the measured ballast concentration and the predetermined threshold value to maintain a predetermined concentration of ballast in the ballasted flocculation zone.

* * * * *